Nov. 11, 1958 V. C. LARSON 2,859,614
DRILL HOLE VOLUME LOGGING DEVICE
Filed Jan. 26, 1956 3 Sheets-Sheet 1

Vernon C. Larson  Inventor

By Richard A. Nagel  Attorney

Nov. 11, 1958  V. C. LARSON  2,859,614
DRILL HOLE VOLUME LOGGING DEVICE
Filed Jan. 26, 1956  3 Sheets-Sheet 2

Vernon C. Larson  Inventor

By Richard W. Nagel Attorney

Vernon C. Larson  Inventor

By Richard N. Nagel Attorney

United States Patent Office 2,859,614
Patented Nov. 11, 1958

2,859,614

DRILL HOLE VOLUME LOGGING DEVICE

Vernon C. Larson, Calgary, Alberta, Canada, assignor, by mesne assignments, to Jersey Production Research Company Application January 26, 1956, Serial No. 561,547

4 Claims. (Cl. 73—149)

The present invention relates generally to the logging of boreholes. More particularly, it relates to apparatus for measuring and recording the cumulative volume of a borehole. The invention especially concerns an apparatus for determining the cumulative volume of a borehole wherein electrical signals which are functions of the logging rate and the cross sectional area of the borehole are employed to generate an electrical signal which in turn is a direct function of the borehole volume. The invention may be used alone or in conjunction with conventional well logging operations, as for example, caliper logging and the like.

In a well drilling operation it is frequently desirable to know the physical characteristics of the drill hole. This is especially true in oil well drilling where a number of logging operations are conventionally carried out. For example, a caliper log is frequently used to indicate and record the diameter of a borehole throughout its length. Similarly, electrical logs and temperature logs may be obtained to ascertain the electrical properties and the temperatures of the various formations that are pierced by a borehole.

When a well has been completed, a caliper log is frequently made prior to running casing in order to obtain information on the volume of cement which is required to assure cementing the casing up to a level specified either by good completion practice or by government conservation agencies. The caliper log usually presents a record in which the borehole diameter is plotted against depth; and at least one such log presents a curve of hole cross-sectional area vs. depth. Either type of log affords sufficient information for one skilled in the art to ascertain the volume of a hole; but in both cases it is necessary to integrate the recorded curve in order to obtain a reasonably accurate measure of the hole volume. Such an operation is performed by a manual or semi-manual procedure and is therefore time-consuming and expensive.

Accordingly, it is an object of the present invention to provide an apparatus for automatically and directly ascertaining the volume of a drill hole from the logging rate and the hole diameter measurements that are made throughout the length of the hole. More particularly, it is an object of the invention to avoid the use of manual or semi-manual means for determining the volume of a borehole and instead to provide an automatic procedure thereby attaining greater accuracy and speed of determination. It is especially an object of the invention to provide an apparatus which is capable of indicating and recording the cumulative volume of a borehole as the apparatus is lowered into the borehole. It is further an object of the invention to provide an apparatus which is inexpensive, accurate, efficient and compact.

These and other related objects will be apparent and understood in the following description taken in conjunction with the attached drawing in which:

Figure 4 is a schematic diagram of a capacitor integrator when the capacitor has a leakage which must be compensated for.

Figure 1:
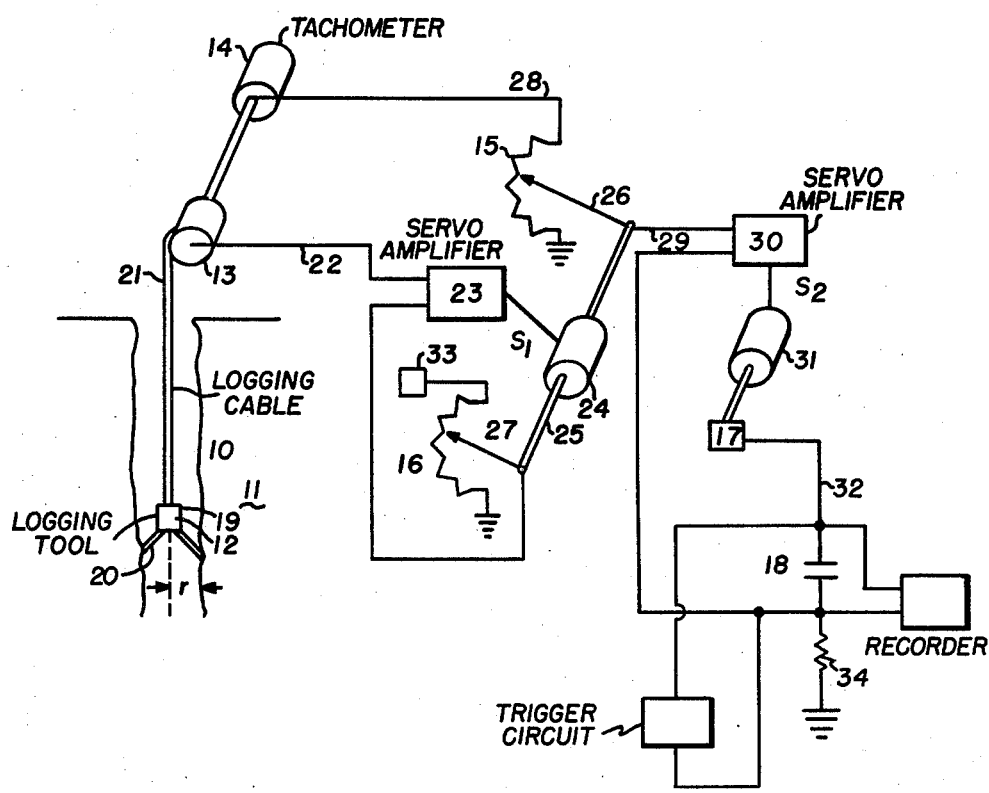
Figure 1 is a schematic diagram illustrating the principal components of an apparatus embodiment of the invention.

In this description and in the drawing it will be considered that the illustrated apparatus is employed to determine the cumulative volume of a borehole which has been drilled within a cross section of the earth. Referring first to Figure 1, there are illustrated a caliper-type logging tool 12, a cable sheave 13, tachometer 14, two servo mechanisms $S_1$ and $S_2$, non-linear potentiometer 15, linear potentiometer 16, current controller 17 and integrating condenser or capacitor 18.

Caliper logger 12 may be any one of a number of commercially available tools which are conventionally employed to run caliper logs of boreholes. The tool in the figure consists of a body member 19 and extensible arms 20 which are hinged to the body member. The arms 20, which may be two or more in number, ride against the surface of the borehole and are connected to suitable electrical circuit means adapted to produce an electrical signal which is directly related to the radius of the borehole. Thus, as the logging tool is raised or lowered within the borehole 10, it generates an electrical signal which is a direct indication of the diameter of the borehole at any given vertical point within the hole.

The signals that are developed by the logging tool 12 are transmitted through logging cable 21 and thence through electrical circuit means 22 to servo unit $S_1$. This unit includes a servo amplifier 23 and a servomotor 24. Shaft 25 of motor 24 drives movable arm 27 of potentiometer 16, the latter having impressed across it a direct current potential by potential source 33. The amplifier amplifies the algebraic difference between the signals transmitted from the tool 12 and the signals appearing between arm 27 of potentiometer 16 and ground to a magnitude sufficient to operate motor 24; and by proper selection of the servo amplifier 23 and the motor 24, the rotational movement of the motor shaft 25 is made proportional to the radius of the borehole 10. The proper selection and the operation of servo mechanisms are well understood by those skilled in the art, and no detailed description of this subject matter is included here. For the purposes of the invention, any suitable servo mechanism and any suitable logging tool may be employed.

As illustrated in the figure, shaft 25 of motor 24 is also mechanically connected to the movable arm 26 of potentiometer 15. Accordingly, arm 26 is moved a distance which is directly related to the size of the electrical signal which is generated by logging tool 12 and therefore also directly related to the radius of the borehole 10. The purpose of this relationship will be developed in more detail and will become clearer a little later in this description.

In addition to the electrical signal which is developed by the logging tool 12, another electrical signal is developed by tachometer 14 which is mechanically connected to the cable sheave 13. Sheave 13 serves to raise or lower logging tool 12 within borehole 10 and accordingly rotational movement of the sheave can be made to develop an electrical signal which is a direct function of the rate at which the logging tool 12 is lowered within the hole 10. Thus, the shaft of sheave 13 may be directly and mechanically connected with the shaft of tachometer 14 which may suitably be a D. C. generator. In this manner, as logging tool 12 is lowered within borehole 10, tachometer 14 generates an electrical signal, the cumulative magnitude of which is a direct function of the depth to which the tool is lowered. Expressed otherwise, tachometer 14 generates an electrical signal whenever tool 12 is moved within the borehole 10; and the generated signal at any given moment is directly related to the rate of movement that the tool has experienced.

The signal generated by the tachometer is transmitted by suitable electrical circuit means 28 to non-linear potentiometer 15 which is connected such that the resistance between the movable arm 26 and ground is proportional to the square of the rotation of shaft 25 and correspondingly to the movement of the contact arm 26. The construction and operation of a suitable non-linear potentiometer are matters well understood by those skilled in the art and accordingly, no detailed description of this portion of the apparatus is included here. It will be noted, however, that the potentiometer 15, the motor 24, the shaft 25 and the movable arm 26 are arranged such that an increase in the radius of the borehole 10 causes movable arm 26 to increase the amount of effective resistance between the movable arm 26 of potentiometer 15 and ground.

Accordingly, the magnitude of the signal which is transmitted from the tachometer through the potentiometer and the contact arm 26 to electrical circuit means 29 is proportional to the product of the square of the radius of the borehole and the logging rate. This signal is transmitted to amplifier 30 of servo unit $S_2$. Servo unit $S_2$ also comprises servomotor 31 which controls the output current of current controller 17, which current flows through electrical circuit means 32 into integrating capacitor 18 and through resistor 34. A signal from resistor 34 is also transmitted to amplifier 30. The amplifier 30 balances the signal from potentiometer 15 against the voltage developed by current flowing from current controller 17 through resistance 34. If the signal from the movable arm 26 of potentiometer 15 and that from resistance 34 are not equal, amplifier 30 will amplify their difference and drive motor 31, increasing or decreasing the current coming from current controller 17 so as to make the signal difference zero. Thus, the current $i$ from the current controller 17 is controlled by means of a continuous balancing process so as to be at all times proportional to the signal coming from arm 26 of potentiometer 15. The current from the current controller is D. C. in character.

The device as thus far described produces a voltage on condenser 18 which at any given time is proportional to the volume of the hole logged. If it is desired or necessary to obtain the true volume of the hole logged in some convenient unit of volumetric measurement such as barrels, cubic feet, etc., the constant of proportionality can be altered to effect the desired calibration by changing the reference voltage 33, changing the electrical size of the integrating capacitor 18, changing the electrical size of the resistor 34, changing the constant of proportionality of the tachometer generator 14, by choice of gearing between the sheave 13 and the generator 14, by feeding only a fraction of the output voltage of generator 14 to potentiometer 15, by changing the sensitivity of the logging tool 12, by feeding a fraction of the output from logging tool 12 to the amplifier 23, or by a combination of the above adjustments.

Having briefly indicated the various components of the present apparatus that are illustrated in Figure 1, and having in a general way indicated the function of each component in the apparatus, attention is now directed toward a brief consideration of the manner in which the apparatus is employed. Thus, again referring to the figure, the logging tool 12 is inserted and then lowered within the borehole 10. As it is lowered, two electrical signals E and $E_r$ are developed. These two signals and the functions to which they are related are indicated in the figure. Thus, E is indicated as the signal which is developed by the tachometer 14 and mathematically may be considered to be proportional to the term $dx/dt$ where $dx$ is the increment of the hole depth traversed in an increment of time $dt$. $E_r$, on the other hand, is developed by the logging tool 12 and is directly proportional to the radius $r$ of the borehole, assuming the hole to be substantially circular.

$E_r$ is transmitted via circuit means 22 to the input of servo amplifier 23 where it is amplified and employed to actuate motor 24. Actuation of the motor in turn causes both ends of shaft 25 to rotate thereby causing simultaneous movement of the two contact arms 26 and 27. Movement of the contact arm 27 causes a signal generated by the reference potential 33 to be balanced against $E_r$ whereby rotational movement of the shaft 25 is interrupted or ceased when it has rotated an angular distance $\theta$ which is directly proportional to the hole radius $r$.

As explained above, contact arm 26 moves simultaneously with contact arm 27. Contact arm 26, however, moves along a potentiometer 15 which, unlike potentiometer 16, is non-linear and possesses a resistance between its movable arm and its ground and terminal which is directly proportional in magnitude to the square of the shaft rotation of the motor 24. Thus, the signal which is transmitted to the servo amplifier 30 is directly proportional to $r^2 dx/dt$. This latter signal, which is proportional to rates of change in borehole volume, is integrated by means of the current controller 17 in combination with the integrating condenser 18. Specifically, the servomotor 31 which is driven responsive to the signal causes a current to be transmitted to the condenser 18 which is proportional to $r^2 dx/dt$.

Charging of the condenser 18 is continued so long as the logging tool 12 is lowered within the hole 10. Upon completion of the logging operation, the tool 12 is stopped, and the total charge on the condenser 18 is measured. By suitable precalibration, this value (i. e. the charge on the condenser) can be employed directly to indicate the volume of the borehole 10.

At this point it will be noted that the foregoing description is intended to illustrate the principles of the invention, and numerous modifications may be employed without department from the scope of the invention. Thus, it is contemplated that the charge on the condenser 18 can be recorded in accordance with procedures which are well recognized in the art. Furthermore, the signals $E_r$ and E may also be used to obtain supplemental logs such as are conventional in the art. Again, various types of reference potentials may be employed such as will be apparent to those skilled in the art.

Figure 2:
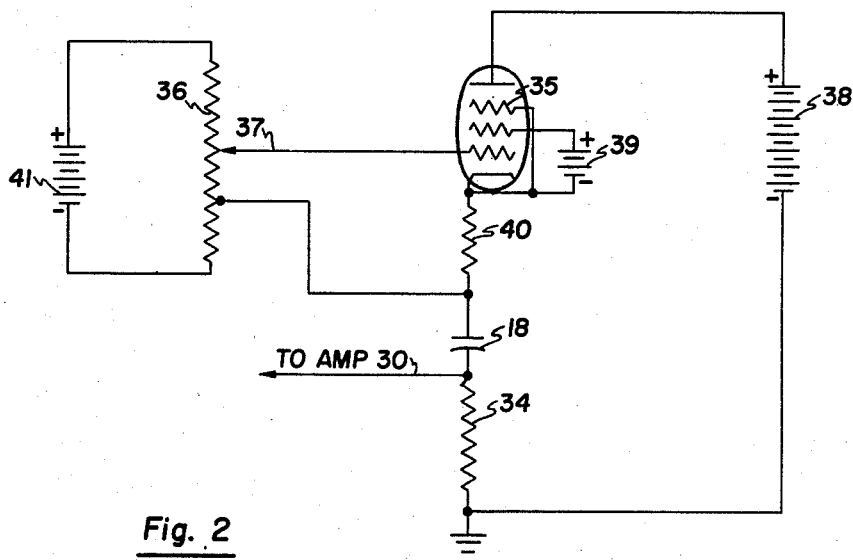
Figure 2 illustrates a particularly preferred form of current controller for use in conjunction with the present invention.
Figure 4:
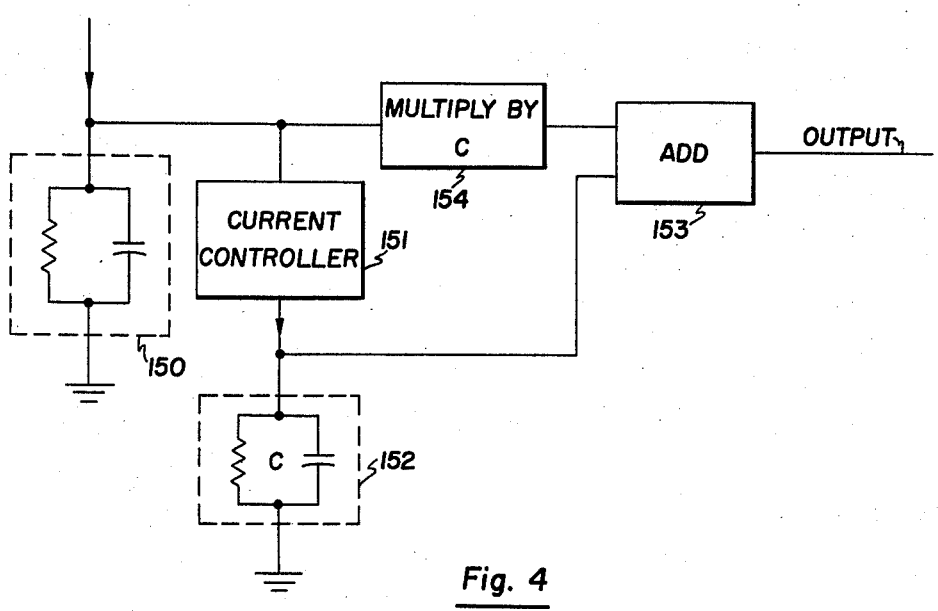

Various well known types of current controllers may be employed such as rheostats or variable resistors. A particularly preferred type of controller, however, possessing especially desirable qualities is illustrated in Fig. 2. Here a pentode electron tube 35 is connected in what may be called a constant current circuit. The advantage in this type of connection will become evident later in the discussion.

In operation, a current will flow from source 38 through tube 35 charging condenser 18. This same current flows through resistor 34 causing a voltage drop which is balanced against the voltage coming from potentiometer 15. If the two voltages are not equal, amplifier 30 drives motor 31 which in turn moves arm 37 of potentiometer 36. This action alters the grid-to-cathode voltage of tube 35 and hence increases or decreases the current flowing until the above-mentioned voltages are equal. In the event that the voltage from potentiometer 15 is zero, the motor drives the movable arm 37 of potentiometer 36 in such a direction as to apply a sufficiently large negative grid-to-cathode voltage to tube 35 that the anode current is reduced to a value closely approximating zero.

For satisfactory operation of the circuit, the value of the anode voltage supply 38 must be greater than the sum of the maximum voltage drops occurring across the circuit elements, screen voltage supply 39, resistor 40, integrating capacitor 18, and resistor 34. In general, if the supply 38 has a voltage which is twice that to which integration capacitor will be permitted to charge, values for the other voltage drops can be found which will result in an operable circuit.

It will be noted that when condenser 18 is initially uncharged, the anode-to-cathode voltage applied to tube 35 will be about twice the value obtaining when the integration capacitor is fully charged. If a triode circuit of the conventional type were used instead of the constant current pentode connection, this variation in anode-to-cathode voltage would result in approximately a similar fold variation in current entering condenser 18. Hence motor 31 would have to correct continuously for this variation in anode current with anode-to-cathode voltage, in addition to its duties of making the current follow the voltage from potentiometer 15. With the constant current connection, the anode current of tube 35 is almost independent of the anode-to-cathode potential and therefore motor 31 has fewer corrections to make during operation of the computer and the life of the associated moving parts are prolonged.

Although a rheostat or variable resistor could be employed instead of tube 35, it would suffer from the same disadvantage as a triode circuit in addition to having to be capable of a wide range of resistance variation in order to provide for a current approximating zero in the event that the signal from potentiometer 15 was zero. Indeed, the range would lie outside the range of commercially available rheostats.

In selecting a suitable integrating capacitor such as is identified by the legend 18 in Figure 1, it is preferred that the capacitor have a sufficiently low leakage. Listed below is a series of equations which are contemplated to enable a person skilled in the art to choose the characteristics of the integrating capacitor. They are derived on the basis of making the effects of leakage resistance negligible. The following variables are first defined:

$v$ voltage corresponding to full charge on integrating capacitor—volts
$h$ time for integrating capacitor to charge from zero to $v$ volts—minutes
$c$ electrical capacity of integrating capacitor—microfarads
$R_1$ leakage resistance of integrating capacitor—megohms
$R_1 c$ self time constant of integrating capacitor—seconds
$R_a$ minimum acceptable leakage resistance of integrating capacitor—megohms
$i$ average current which is fed to integrating capacitor—microamperes
$i_a$ maximum acceptable leakage current—microampers
$p$ permissible percent of total charge which can be gained or lost by integrating capacitor The following equations define the interrelations of the variables:

$$i = \frac{cv}{60h} \quad \text{Equation B}$$

$$i_a = pi \quad \text{Equation C}$$

$$R_a = \frac{v}{pi} = \frac{v}{i_a} \quad \text{Equation D}$$

$$R_1 = \frac{R_1 c}{c} \quad \text{Equation E}$$

$$R_a < R_1 \quad \text{Equation F}$$

The equations B, C, D, E and F permit one to select the integration capacitor. The current controller must be able to supply a minimum current lower than $i_a$ and a maximum current two to five times as large as $i$.

The equations may be derived as follows. The current necessary to charge a capacitor of $c$ farads from zero to $v$ volts in $t$ seconds is given by $$i = c\frac{dv}{dt} = c\frac{v}{t}$$

or $$i = c\frac{v}{60t}$$

if $t$ is in minutes. This is only the average current necessary and the current controller must be able to supply any surges necessary in particularly rugose holes.

In the event that logging were interrupted during a run, no current should be injected into the capacitor. Practically, this is not necessary; and it will therefore be assumed that an error of $p$ percent would be admissible. Thus the current $i_a$ which one could permit to flow into the capacitor in such a situation would be $p$ percent of the average injected current or $i_a = pi$.

If $p$ percent of the average current is permitted to leak into the capacitor under certain conditions, the same current may be permitted to leak off the capacitor due to the leakage resistance of the condenser. The minimum acceptable leakage resistance may be calculated from Ohm's law. Considering the worst case, i. e. when the condenser is at its highest potential $v$, $$R_a = \frac{v}{i_a} = \frac{v}{pi}$$

The leakage resistance $R_1$ of a capacitor may be found by dividing the self time constant of the capacitor by its capacitance. In order that the leakage requirements set for the capacitor be met, the leakage resistance of the capacitor $R_1$ must be greater than the minimum acceptable leakage resistance $R_a$.

The following example is presented to illustrate the above requirements and to indicate the practicability of the invention. In this example it will be assumed that it is desired to log a 10,000 ft. hole having a radius of 6 inches and a volume of 1400 bbls. It will be further assumed that the voltage rise on the capacitor employed is to represent the total hole volume with:

zero volts=zero hole volume
300 volts=total hole volume

It will additionally be assumed that the logging time for the 10,000 ft. hole equals two hours or 120 minutes. Then, $v = 300$ volts
$h = 120$ minutes Selecting a capacitor with $c = 100$ microfarads, it will be seen from Equation B that:

$$i = \frac{100 \times 300}{60 \times 120} = 4.17 \mu a$$

This is a reasonable current value.

Next, assuming that $P = 1$ percent, then: from Equation C, $i_a = .0417\ \mu a$ This likewise is a reasonable controller cut-off. From Equation D, $$R_a = \frac{300}{.0417} = 7200 \text{ megohms (approximately)}$$

Capacitors which have a self-time constant of 1,000,000 seconds are available, so from Equation E:

$$R_1 = \frac{1,000,000}{100} = 10,000$$

Since $R_a < R_1$, the choices are satisfactory for the assumed example.

The discussion to this point has considered the integration capacitor as being initially uncharged and close to its maximum charge when logging is completed. It is also contemplated that the volume may be recorded continuously as a function of depth by a conventional recorder whose chart movement is synchronized with logging depth by a selsyn motor. Since conventional recorders usually have a chart width less than 10 inches, the accuracy with which the total volume of a bore hole could be read would be limited. A more practical system would therefore more likely use a slightly different scheme for recording—for example, a scheme in which the maximum voltage to which the condenser would be allowed to charge would represent a convenient unit of volume—say 10 barrels. A conventional recorder would follow the capacitor voltage as before, and a full scale deflection would represent 10 barrels of volume. When the integrating capacitor reached the chosen maximum voltage, a trigger circuit would momentarily discharge the capacitor and it would proceed to charge again. The recorder chart would thus show a gradually increasing deflection until it reached the 10 barrel calibration and then return to the zero end of the scale and start to record the next increment of volume. In interpreting such a chart, the operator would choose the two depths between which he desired a volume; manually or automatically count the number of times the recorder measured the 10 barrel increment; note the increments of volume between the nearest even 10 barrel volume points and the depths in question; and sum the readings to obtain the desired volume.

Figure 3:
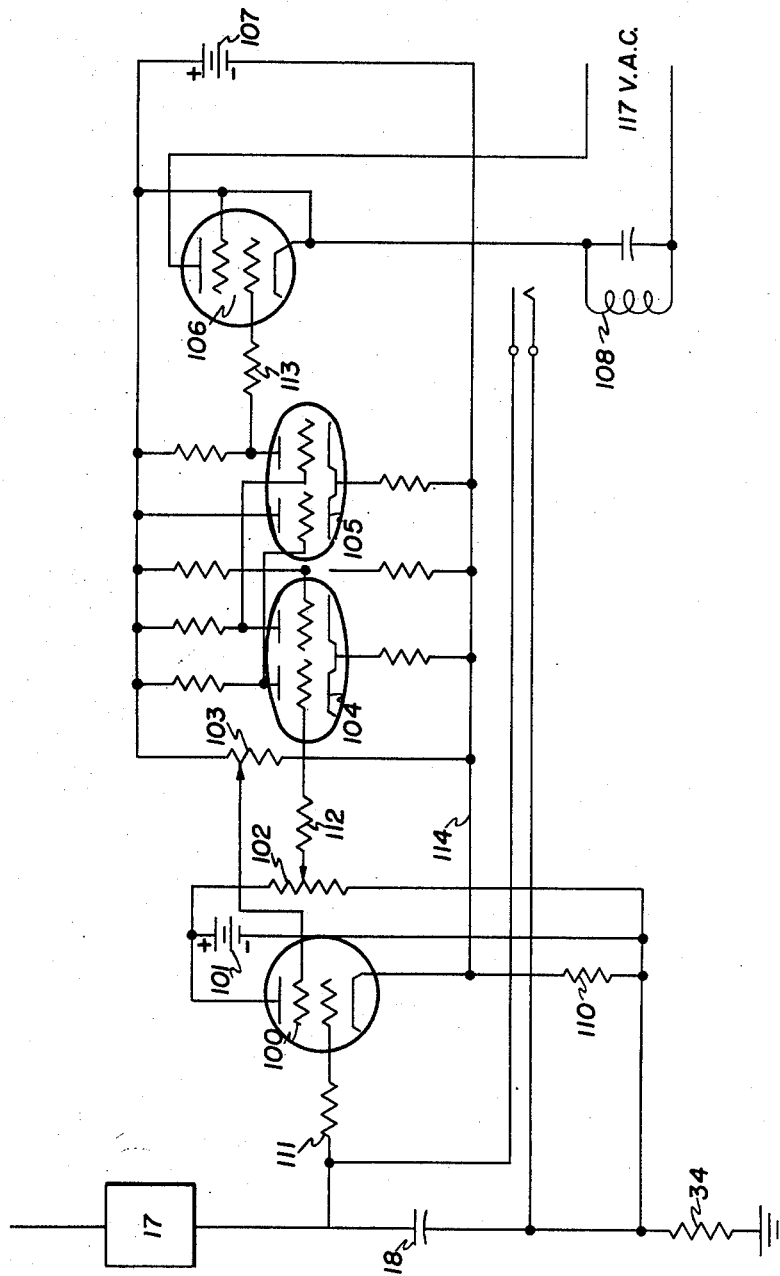
Figure 3 illustrates a suitable triggering device for discharging the integrating capacitor portion of the apparatus when desired.

Figure 3 is a circuit of a suitable triggering device although other types of trigger circuits can be employed. A brief description of the operation of the trigger circuit follows.

Tube 100 serves to isolate the trigger circuit (comprised of tubes 104, 105 and thyratron 106) from the integrating capacitor. Tube 100 is connected as a cathode follower, obtaining its screen voltage from potentiometer 103 and its anode voltage from battery 101. The grid of tube 100 is connected to the integrating capacitor 18 through grid resistor 111. The resistor is of high electrical value in order to minimize the effects of any residual grid current in tube 100. The voltage developed across resistor 110 and appearing on line 114 is proportional to the voltage appearing on the integration capacitor. Potentiometer 102 applies a voltage positive with respect to ground to the first grid of tube 104 through high resistance 112. The setting of potentiometer 102 determines the voltage at which the trigger circuit operates. The circuit so operates that as long as the voltage on line 114 is lower than that set by potentiometer 102, the relay 108 is not energized. However, when the voltage on line 114 is (approximately) equal to that set by potentiometer 102, relay 108 closes, thereby discharging integrating capacitor 18, permitting it to recharge from zero as before. The trigger circuit resets itself. Note that a mechanical counter could be operated by relay 108 and also, that a printing wheel mounted on the recorder chart could be operated.

In the discussion preceding the subject of capacitor integrators, the different variables and the quality of the capacitor were chosen such as to make the effect of capacitor leakage current negligible. Where the leakage is not negligible, it is still possible to compensate for capacitor leakage current as in the following manner.

The current $i$ for which it is desired to find the time integral enters the integrating capacitor 150. The output voltage $v_c$ from this capacitor is multiplied by the factor C by the multiplier 154 and the quantity $Cv_c$ enters the adder 153. The voltage $v_c$ also enters current controller 151 where a current is produced which is proportional to $v_c$. The output current from the current controller enters a second integrating capacitor 152 and the output voltage from 152 is proportional to the integral of $v_c$, the constant of proportionality being $K''$. This voltage is also fed to adder 153 and there it is summed with the voltage $Cv_c$ from the multiplier 154. The resulting output from the adder is thus proportional to the quantity $$K'' \int v_c dt + Cv_c$$

If $K''$ is adjusted so that $$K'' = \frac{1}{R_1}$$

a signal exists which is proportional to $$I = \frac{1}{R_1} \int v_c dt + Cv_c$$

This signal is not exactly proportional to the true integral of $i$ since the capacitor integrator 152 must also be considered as having a finite leakage resistance. However, the leakage resistance of integrating capacitor 150 has been corrected for; and the output is a closer approximation of the desired quantity. It is evident that it is possible to correct for the leakage resistance of capacitor 152 in a similar manner and achieve a still closer approximation to the correct integral.

It will be noted at this point that the foregoing description and examples have been intended to be merely illustrative of the present invention, and it is not intended that the invention be limited in its scope to this particular material. For example, it will first be appreciated that the invention may utilize caliper logging devices that operate when they are run up and/or down a bore hole.

What is claimed is:

1. An apparatus for determining the volume of a bore hole which comprises in combination logging means adapted to be moved vertically within a bore hole and to develop a first electrical signal which is proportional to the radius of the bore hole, means for developing a second electrical signal which is proportional to instantaneous rates of change in the distance traveled by the logging means within the bore hole, means for squaring said first signal, means for multiplying said squared signal and said second signal to develop a third signal which is proportional to instantaneous rates of change in the volume of the bore hole, and capacitor means to integrate said third signal and to develop a charge which is proportional to the cumulative volume of the bore hole.

2. An apparatus for determining the cumulative volume of the bore hole which comprises in combination caliper logging means adapted to be lowered within the bore hole and to develop a first electrical signal which is directly proportional to the radius of the bore hole, servo mechanism means for developing a shaft rotation which has an angular displacement proportional in magnitude to the magnitude of said first signal, an electrical generator to develop a second electrical signal which is directly proportional to instantaneous rates of change in the movement of said logging means, electrical-mechanical means for multiplying said first and second signals to develop a third electrical signal which is directly proportional to instantaneous rates of change in the volume of the bore hole, and an integrating condenser for collecting said third signal and developing a fourth signal which is directly proportional to the cumulative volume of the bore hole.

3. An apparatus for determining the volume of a bore hole which comprises in combination a bore hole diameter logging means adapted to be moved vertically within the bore hole and to develop a first electrical signal which is proportional to the diameter of the bore hole, means to develop a second electrical signal which is proportional to the rate of change of the position of the logging means within the bore hole at each point within the bore hole, analog means to square said first signal, means for multiplying said squared signal and said second signal to develop a third signal which is proportional to the rate of change in the volume of the bore hole at each position of the logging means within the bore hole, and capacitor means for integrating said third signal and developing a charge which is a direct function of the cumulative volume of the bore hole.

4. An apparatus for determining the volume of a bore hole which comprises in combination caliper logging means adapted to be lowered within a bore hole and to generate a first electrical signal which is proportional to the diameter of the bore hole at each point along the bore hole, analog means to square said first electrical signal, means responsive to movements of said logging means to generate a second electrical signal which is proportional to the rate of movement of the logging means at each point within the bore hole, means to multiply said squared and second signals to generate a third signal which is proportional to the rate of volume change of the bore hole at each position of the logging means within the bore hole, and capacitor means to integrate said third signal.

References Cited in the file of this patent

UNITED STATES PATENTS 2,716,340     Nance et al. _____ Aug. 30, 1955